United States Patent [19]

Adahan

[11] 3,719,399
[45] March 6, 1973

[54] SKID CONTROL MODULE

[76] Inventor: Carmeli Adahan, 1626 Bonita Avenue, Apt. No. 6, Berkeley, Calif. 94709

[22] Filed: Oct. 26, 1970

[21] Appl. No.: 83,811

[52] U.S. Cl. .............303/21 BE, 188/181 C, 303/20, 317/5
[51] Int. Cl. ...............................................B60t 8/08
[58] Field of Search ...188/181 A; 303/20, 21; 317/5; 324/162; 340/262

[56] References Cited

UNITED STATES PATENTS

| | | | |
|---|---|---|---|
| 3,017,145 | 1/1962 | Yarber | 303/21 P |
| 3,398,995 | 8/1968 | Martin | 303/21 BE |
| 3,511,542 | 5/1970 | Fielek, Jr. | 303/21 CE |
| 3,522,973 | 8/1970 | Klein et al. | 303/21 R |
| 3,545,817 | 12/1970 | Yarber | 303/21 BE UX |
| 3,572,848 | 3/1971 | Marouby | 303/21 BE |
| 3,576,351 | 4/1971 | Collins | 303/21 CG UX |
| 3,578,819 | 5/1971 | Atkins | 303/21 BE |
| 3,584,921 | 6/1971 | Crawford | 303/21 BE |
| 3,604,760 | 9/1971 | Atkins | 303/21 BE UX |

FOREIGN PATENTS OR APPLICATIONS

| | | | |
|---|---|---|---|
| 1,810,163 | 7/1970 | Germany | 303/21 BE |

Primary Examiner—Trygve M. Blix
Assistant Examiner—Stephen G. Kunin
Attorney—Warren P. Kujawa

[57] ABSTRACT

An skid control control module which generates accurate signals indicating the instantaneous velocity of a moving member from successive input signals with no appreciable time delay. Each instantaneous velocity signal of the member is compared with a signal developed according to a maximum permissible acceleration rate. Whenever the comparison indicates the member exceeded the permissible rate, a control signal is generated which is only terminated when a later comparison indicates the motion of the member is back within the permitted range. This control signal controls the braking force so as to prevent an impending skid.

10 Claims, 4 Drawing Figures

FIG. 1

FIG_2

FIG_3

FIG_4

——————— VEHICLE VELOCITY-$V_V$
——————— WHEEL VELOCITY-$V_W$
— — — — — PRESET DECELERATION THRESHOLD-$\alpha$
— — — — — BRAKE PRESSURE-$P_W$

INVENTOR.
CARMELI ADAHAN

SKID CONTROL MODULE

BACKGROUND OF THE INVENTION

1. FIELD OF INVENTION

This invention relates to an apparatus for measuring the speed and rate of acceleration or deceleration of a moving object and for providing control signals indicative thereof. More particularly, this invention relates to devices for measuring the speed and rate of acceleration or deceleration of a moving vehicle and for providing a control signal whenever the vehicle exceeds a maximum predetermined acceleration/deceleration level. In a specific aspect, the invention relates to devices which are used, inter alia, to control the application of braking forces to the wheels of a moving vehicle in a manner to prevent skidding.

2. DESCRIPTION OF PRIOR ART

Many diverse devices are known which are used to measure the speed and acceleration or deceleration of a moving object. Some devices employ speed and acceleration sensitive sensors fastened to the object which provide a variable signal whose magnitude is a function of the velocity and time rate of change of velocity; others utilize velocity or acceleration signals from motion sensors attached to the object to compute instantaneous or average acceleration or velocity in accordance with a programmed formula. Generally, the accuracy of prior art devices has been proportional to their degree of sophistication, the more accurate devices being more complex and hence more expensive to build and maintain.

Anti-skid braking systems are also known which utilize velocity-related signals obtained from motion sensors on a wheeled vehicle to develop acceleration signals, which in turn are used to control braking systems installed on the vehicle. In typical prior art devices, such as that disclosed in U.S. Pat. No. 3,245,727, the velocity-related signals are applied to several analog circuits which modify these signals in accordance with a desired scheme to produce solenoid control signals for regulating hydraulic pressure in the vehicle brake system. Typically, successive signals may be differentiated, integrated, shaped, and otherwise modified to produce the desired control signals. One known technique for obtaining wheel velocity is to integrate a large number of individual pulses produced by rotation of the wheel to generate a signal whose potential is a function of velocity.

It is known that signal modification circuits introduce a finite time delay between reception of the velocity-related signal and production of the control signal. Generally, the greater the number of such modification circuits, the larger the response time of the control system. Further, it is also known that systems which require a substantial number of successive input signals to generate a valid control signal introduce a substantial time delay between the receipt of a given signal and the production of an accurate control signal in response thereto. If the response time is very long, the velocity of the wheel subject to control will have changed substantially before the production of the control signal, and thus optimum results will not be obtained by the use of that control signal to regulate the braking forces.

SUMMARY OF THE INVENTION

The invention disclosed herein comprises an acceleration control module capable of generating several useful signals in response to the reception of successive input signals related to the instantaneous velocity of a moving object, all signals being generated with a minimum time delay. In one aspect of the invention, each successive input signal is used to compare a velocity signal computed in accordance with a predetermined maximum permissible acceleration rate with a measured velocity signal related to the velocity of the object at that instant. If the object has exceeded the maximum permissible acceleration rate, the acceleration control module generates a control signal indicating the occurrence of that condition. This control signal is later terminated when the average acceleration of the moving object measured from the beginning of the control signal falls back below the predetermined maximum permissible acceleration rate.

In another aspect of the invention, each successive input signal is utilized to provide a highly accurate indication of the instantaneous velocity of the object.

In still another aspect, the invention may be used as a skid control module in an anti-skid braking system for a vehicle to produce a control signal for relieving brake pressure whenever the wheel exceeds a predetermined maximum permitted deceleration rate. When brake pressure is relieved in this manner, wheel lock is thoroughly eliminated which prevents skidding of the vehicle. As an additional feature, a delay disable circuit is provided which allows a wheel whose brake pressure has been previously relieved to accelerate to the velocity of the vehicle before permitting the reapplication of braking forces to that wheel.

For a fuller understanding of the nature and advantages of the invention, reference should be had to the following detailed description taken in conjunction with the accompanying drawings.

DESCRIPTION OF THE PREFERRED EMBODIMENT

In the ensuing description, the term acceleration is used to denote both positive and negative acceleration. Since it is customary to refer to the negative acceleration experienced by a moving vehicle during braking as deceleration, this latter term as used herein is to be construed as an alternative term for negative acceleration.

Figure 1:
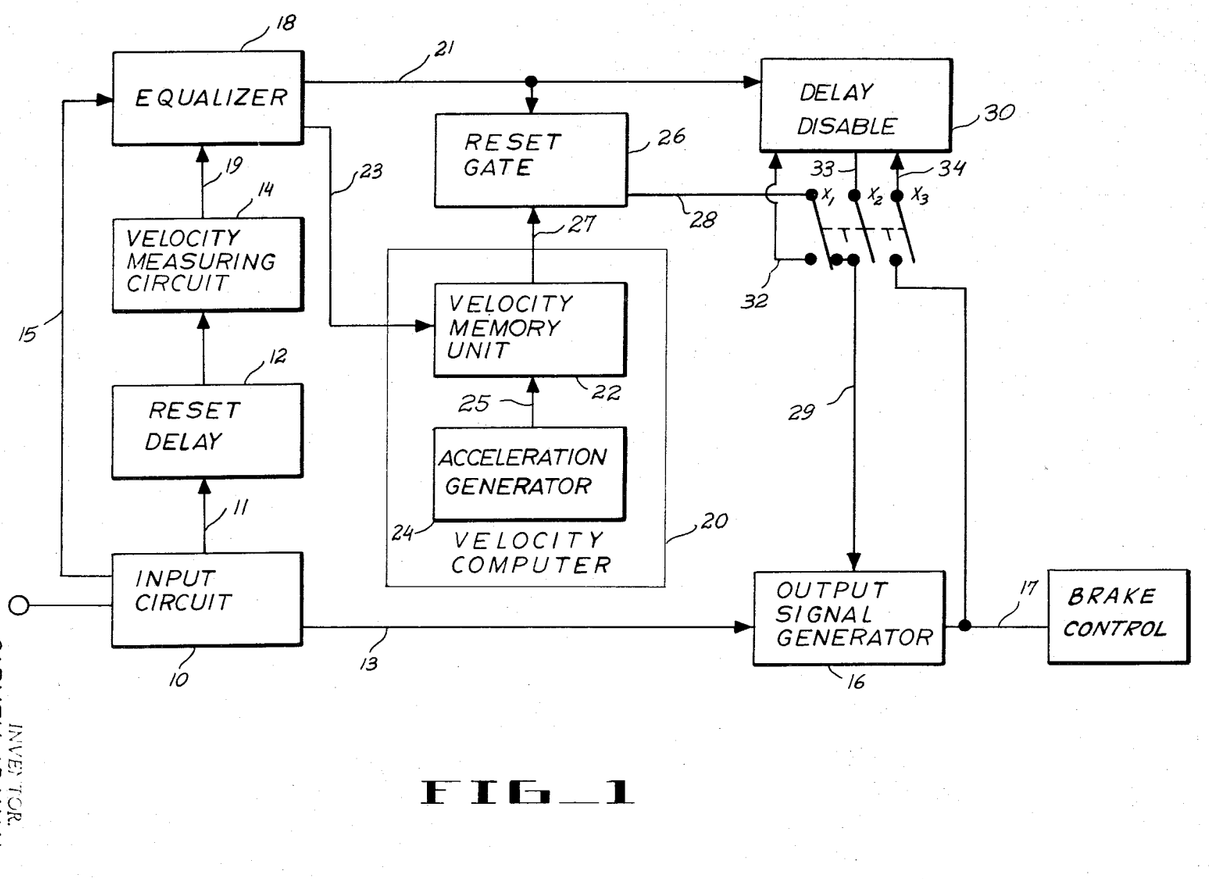
FIG. 1 is a block diagram of a preferred embodiment of the invention.

Turning now to the drawings, FIG. 1 illustrates in block diagram form a preferred embodiment of an acceleration control module constructed according to the invention. The acceleration control module comprises several basic subcircuits interconnected as shown, each basic subcircuit being illustrated in detail in FIG. 2 and described below.

An input circuit 10 has an input for receiving speed related signals $V_s$ from a moving member, such as a rotating wheel on a moving vehicle. These signals may take the form of a series of time-spaced pulses, a waveform whose period is a function of speed, or other signal forms known to those skilled in the art, the repetition rate of which is related to speed. Input circuit 10 provides a number of output signals which are used to condition several circuits in the manner described below.

Input circuit 10 is coupled to a reset delay circuit 12 by an output lead 11, and reset delay circuit 12 is coupled to the input of a velocity measuring circuit 14. Output 11 provides a signal for resetting velocity measuring circuit 14 to an initial condition after a predetermined delay introduced by reset delay circuit 12. After being thus reset, velocity measuring circuit 14 begins to develop a signal $V_m$ whose magnitude is a function of the speed of the rotating member. Each time an input signal is received by input circuit 10, velocity measuring circuit 14 is reset to an intial condition.

Input circuit 10 is also coupled to an output signal generator 16 via output lead 13. This second output 13 provides a pulse signal for enabling output signal generator 16. After appearance of this enabling signal on output 13, output signal generator 16 provides an output signal to a terminal 17 unless quickly disabled in the manner described below. The terminal 17 can extend to a suitable brake control that is adapted to vary the braking force.

Input circuit 10 is further coupled to an equalizer 18 via output lead 15. This third output 15 provides a signal for actuating equalizer 18. Upon actuation, equalizer 18 compares the value of the velocity measuring circuit 14 signal $V_m$ on output lead 19 to the value of a second velocity signal $V_c$ then present at the output 27 of a velocity computer 20. If the magnitude of the velocity computer 20 signal $V_c$ is greater than the magnitude of the velocity measuring circuit 14 signal $V_m$, equalizer provides an enable signal for a reset gate 26 and a delay disable circuit 30 via a first output 21, and also an equalizer signal for velocity memory unit 22 via a second output lead 23. This latter signal causes velocity memory unit 22 to assume a value determined by the magnitude of the velocity measuring circuit 14 signal $V_m$.

Velocity computer 20 comprises velocity memory unit 22 and an acceleration generator 24. Acceleration generator 24 produces a signal which corresponds to a predetermined maximum permissible acceleration. This signal from acceleration generator 24 is coupled to velocity memory unit 22 via output lead 25. Velocity memory unit 22 develops velocity computer 20 output signal $V_c$ whose initial value is determined by the above-mentioned signal $V_m$ from velocity measuring circuit 14 and whose time rate of change is determined by the predetermined maximum permissible acceleration signal from acceleration generator 24.

The output from velocity computer 20 is coupled via output lead 27 to reset gate 26. Reset gate 26 is coupled to the blade of a first switch X1. With switch X1 in the position shown, whenever an enable signal is present on output lead 21 from equalizer 18, the output signal from velocity computer 20 is coupled via reset gate 26 through the switch X1 contacts to disable input 29 of output signal generator 16 to provide a disable signal for output signal generator 16. In addition to the enable input from equalizer 18, delay disable circuit 30 is provided with a signal input lead 32 coupled to the alternate contact of switch X1, and lead 33 and an enable input 34 coupled to the blades of switches X2 and X3, respectively. As indicated by the broken line, switches X1-X3 are mechanically interconnected so that delay disable circuit 30 may be conveniently inserted into the output signal generator 16 disable circuit when desired. When inserted, delay disable circuit 30 prevents the disabling of output signal generator until the occurrence of a predetermined condition in the manner described below.

The acceleration control module of FIG. 1 has two basic modes of operation: a first mode, in which output signal generator 16 produces no output signal, indicating that the moving member is either not accelerating or is accelerating at a rate which does not exceed the maximum predetermined acceleration rate; and a second mode, in which output signal generator 16 does produce an output signal, indicating that the moving member is accelerating at a rate which does exceed the maximum predetermined acceleration rate. These two modes of operation proceed as follows.

In the first mode of operation, an input signal $V_s$ causes input circuit 10 to reset velocity measuring circuit 14 via output lead 11 after a short delay introduced by reset delay circuit 12. Input circuit 10 also enables output signal generator 16 via output lead 13, and equalizer 18 via output lead 15. Under initial conditions, the level of the velocity computer 20 signal $V_c$ is always greater than that of the velocity measuring circuit 14 signal $V_m$, so that equalizer 18 enables reset gate 26 via output lead 21. The enabling of reset gate 26 permits the output signal on lead 27 from velocity computer 20 to be coupled therethrough and, with switches X1-X3 in the positions shown, to disable output signal generator 16 before an effective output signal is produced.

Substantially simultaneously with the disabling of output signal generator 16, equalizer 18 conditions velocity memory unit 22 to assume a value dependent on the value of the velocity measuring circuit 14 signal $V_m$. This may be accomplished in a number of ways. In the preferred embodiment, velocity memory unit 22 is set to a level substantially equal in magnitude to the value of velocity measuring circuit 14 signal $V_m$. This same result could be accomplished by setting the value of velocity memory unit 22 to the value of velocity measuring circuit 14 signal $V_m$ plus a predetermined factor. Still another way of achieving this end would be to set the value of velocity memory unit 22 to the value of the velocity measuring circuit 14 signal $V_m$ multiplied by a predetermined factor. Other methods will occur to those skilled in the art.

The delay introduced by reset delay circuit 12 is sufficient to enable the above-described velocity memory unit 22 value setting to take place, after which velocity measuring circuit 14 is reset to a predetermined threshold value. After being reset, velocity measuring circuit 14 begins to develop a signal whose level increases according to a predetermined function of time.

Substantially simultaneously therewith, velocity computer 20 signal $V_c$ begins to develop at output 27, the initial value of $V_c$ being determined by the value of velocity measuring circuit 14 signal $V_m$ just prior to reset, and the time rate of change of $V_c$ being determined by the predetermined maximum permissible acceleration signal generated by acceleration generator 24. The development of the velocity measuring circuit 14 signal and the velocity computer 20 signal continues until input circuit 10 receives a subsequent input signal $V_s$.

Upon receipt of a subsequent input signal $V_s$, output signal generator 16 and equalizer 18 are both enabled as before via output leads 13 and 15, respectively. Assuming that the value of the velocity computer 20 signal $V_c$ is again greater than the value of velocity measuring circuit 14 signal $V_m$ when equalizer 18 is enabled, equalizer 18 will again enable reset gate 26 via output lead 21, thereby permitting the output signal from velocity computer 20 to be coupled therethrough to disable input 29 of output signal generator 16, and output signal generator 16 will again be disabled before generating an effective output signal.

Substantially simultaneously with the disabling of output signal generator 16, equalizer 18 will again condition velocity memory unit 22 to assume a value determined by the value of the velocity measuring circuit 14 signal $V_m$ in the manner described above. After this value setting of velocity memory unit 22, velocity measuring circuit 14 will again be reset to the same predetermined threshold value noted above by output 11 from input circuit 10 delayed by reset delay circuit 12.

The first mode of operation continues until the value of the velocity measuring circuit 14 signal $V_m$ exceeds the value of the velocity computer 20 signal $V_c$ at the instant when equalizer 18 has been enabled by input circuit 10 upon receipt of an input signal $V_s$. When these conditions obtain, the acceleration control module operates in the second basic mode as follows. Since the value of the velocity measuring circuit 14 signal $V_m$ exceeds the value of the velocity computer 20 signal $V_c$, no enable signal will appear on output 21 of equalizer 18 to enable reset gate 26. Thus, output signal generator 16, previously enabled by output 13 of input circuit 10, will not be disabled by a signal from velocity computer 20 to disable input 29 and will produce an effective output signal at terminal 17. In addition, velocity memory unit 22 will not assume the value of the velocity measuring circuit 14 signal $V_m$ as before, but will continue to develop a signal from its present value. Thereafter, velocity measuring circuit 14 will be reset to the same predetermined threshold value as before and will begin to develop signal $V_m$ anew. In summary, in the second basic mode of operation output signal generator 16 provides an effective output signal, velocity computer 20 continues to develop an output signal without interruption, and velocity measuring circuit 14 is reset to a predetermined threshold and begins to develop another velocity signal $V_m$. The acceleration control module continues to operate in this second basic mode of operation until the value of the velocity computer 20 signal $V_c$ exceeds the value of the velocity measuring circuit 14 signal $V_m$ at the instant when equalizer 18 has been enabled by input circuit 10 in response to the reception of a subsequent speed signal $V_s$ from the moving member. When these conditions obtain, the acceleration control module shifts back to the first basic mode of operation.

As described more fully below, in certain applications of the acceleration control module of FIG. 1, it is desirable to delay termination of the output signal generator 16 control signal on terminal 17 until the occurrence of a predetermined condition whenever this signal has been present for a predetermined period of time. This may be accomplished by throwing mechanically interlinked switches X1-X3 to their alternate positions and thereby inserting delay disable circuit 30 into the output signal generator disable circuit. When switches X1-X3 are thrown to their alternate positions, the output of reset gate 26 is coupled to the input 32 of delay disable circuit 30 by switch X1, the output 33 of delay disable circuit 30 is coupled to disable input 29 of output signal generator 16 by switch X2, and the output of output signal generator 16 is coupled to a second enable input 34 of delay disable circuit 30 by switch X3. As will be remembered, the first enable input of delay disable circuit 30 is coupled to output 21 of equalizer 18.

As noted above, when the acceleration control module is operating in the second mode, an effective output signal is present at terminal 17 which is coupled to enable input 34 of delay disable circuit 30. When this signal is present at enable input 34, for a predetermined time interval—indicating that the velocity measuring circuit 14 signal $V_m$ has exceeded the velocity computer 20 signal $V_c$ for a corresponding number of previously received speed signals $V_s$—delay disable circuit 30 will be enabled and will prevent output signal generator 16 from being disabled until successive $V_m$ signals indicate that the object is no longer accelerating. The significance of this function is more fully developed below.

Figure 3:
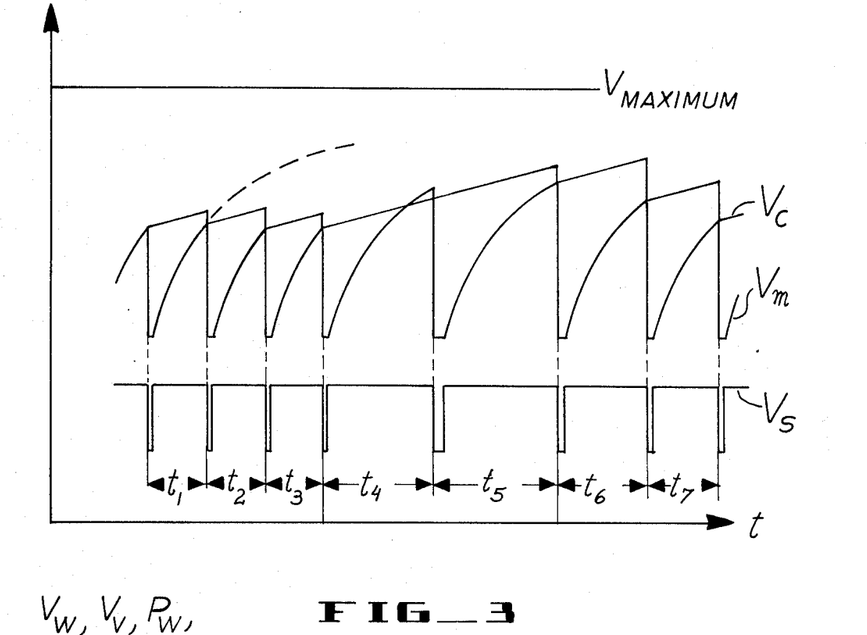
FIG. 3 is a series of idealized waveforms illustrating the operation of the invention.

The relation between the operation of the acceleration control module of FIG. 1 and the actual motion of the moving member is best understood with reference to FIG. 3 wherein idealized waveforms of the speed related input signals $V_s$, the velocity measuring circuit 14 signals $V_m$, and the velocity computer 20 signals $V_c$ are illustrated. Although waveform $V_s$ is drawn at a level below that of the remaining waveforms $V_m$ and $V_c$, it is understood that in practice the level of these waveforms may overlap, if desired.

The speed related input signals $V_s$ are shown in FIG. 3 as a series of successive negative-going rectangular voltage pulses, although, as noted above, other forms of input signals may be utilized. Input signals $V_s$ may be produced by any one of several known pulse generating devices. One such known device used in conjunction with rotating members comprises a magnetic pickup sensor whose output can be shaped to produce a succession of rectangular pulses. Any variation in speed of the rotating member will cause a corresponding variation in the spacing of the rectangular pulses. Thus, the time interval between two successive pulses is a measure of the speed of the rotating member at the instant the second pulse is produced. Likewise, the duration of successive time intervals is related to the speed of the member during successive instants in time.

In the acceleration control module, the instantaneous speed of the rotating member is determined by converting each successive time interval to a potential $V_m$ whose magnitude is a known function of time. This is achieved by resetting velocity measuring circuit 14 each time a $V_s$ pulse is received as described above. Thus, at the beginning of time interval $t_1$, $V_m$ is reset to a predetermined arbitrary threshold value. During $t_1$, $V_m$ develops at output 19 of velocity measuring circuit 14 according to a predetermined function which is represented by the waveform shown in FIG. 3. At the end of time interval $t_1$, $V_m$ is again reset to the same threshold value. After being thus reset, $V_m$ again develops during time interval $t_2$ until a received $V_s$ pulse again resets $V_m$, signifying the end of this time interval and the beginning of time interval $t_3$. This process is repeated for successive intervals $t_3, t_4, \ldots, t_i, \ldots$.

As indicated by the broken line extending one portion of $V_m$, if no subsequent $V_s$ were to appear after reset of $V_m$ to the predetermined threshold level, $V_m$ would eventually attain the value of V MAXIMUM. Since the absence of a $V_s$ pulse indicates a stationary member, V MAXIMUM corresponds to zero velocity. The difference between V MAXIMUM and the level of $V_m$ immediately prior to reset at the end of a given time interval $t_i$ thus corresponds to the instantaneous velocity of the member at that point in time. Likewise, the difference between V MAXIMUM and the successive peaks of $V_m$ provide a history of the instantaneous velocity of the member.

As noted above, the velocity computer 20 signal $V_c$ is developed by varying the magnitude of the initial value of this signal at a rate corresponding to a predetermined maximum permissible acceleration. Since the waveform $V_c$ shown in FIG. 3 increases during each time interval $t_i$, it is evident that $V_c$ corresponds to a predetermined maximum permissible negative acceleration (deceleration) rate. If desired, other waveforms $V_c$ can be utilized which decrease during each time interval $t_i$ and thus correspond to a positive acceleration rate. Moreover, although $V_c$ is increased linearly as a function of time in the preferred embodiment, other functions which may be employed will also occur to those skilled in the art. At the end of time interval $t_2$, $V_c$ represents the minimum permissible value of the speed of the member, i.e. the speed the member would have attained if it had decelerated at the maximum permissible rate. This value is then compared with the actual speed $V_m$ attained by the member. If $V_c$ is greater than $V_m$, which is the situation illustrated, the member has not exceeded the maximum permissible acceleration rate over the interval $t_2$ and no effective output signal will be developed by output signal generator 16.

At the beginning of time interval $t_3$, $V_c$ is again set equal to $V_m$, $V_c$ is increased from this new level in accordance with the maximum permissible acceleration rate until the end of time interval $t_3$, at which time $V_c$ and $V_m$ are again compared. As before, $V_c$ is greater than $V_m$ indicating the member has not exceeded the maximum permissible acceleration rate during time interval $t_3$ and no effective output signal will be developed by output signal generator 16.

The waveforms during time interval $t_4$ represent the situation in which the member has exceeded the maximum permissible acceleration rate during this interval. As is evident from FIG. 3, at the end of time interval $t_4$, $V_m$ is greater than $V_c$, indicating the member attained a speed less than the speed it would have attained had it accelerated at the maximum permissible rate. As noted above, when $V_m$ is greater than $V_c$, output signal generator 16 produces an effective output signal indicating the occurrence of this condition.

In contrast to the action of the acceleration control module illustrated by the FIG. 3 waveforms at the start of the $t_2$, $t_3$, and $t_4$ intervals (corresponding to the first mode of operation discussed above), at the start of the time interval $t_5$ (corresponding to the second mode of operation), $V_c$ is not set equal to $V_m$, but develops continuously from the existing value. Therefore, at the end of time interval $t_5$, $V_c$ represents the speed the member would have attained if it had accelerated at the maximum permissible rate during the interval $t_5$. Thus, at the end of time interval $t_5$, $V_c$ represents the speed the member would have attained if it had accelerated at the maximum permissible acceleration rate over both the $t_4$ and $t_5$ intervals. It is noted that if $V_m$ had been greater than $V_c$ at the end of interval $t_5$, $V_c$ would have continued to develop during interval $t_6$ without first being reset to the then-existing level of $V_m$. Whenever the acceleration control module is in the second mode of operation, the $V_m$ signal is compared with a $V_c$ signal representing the maximum permissible acceleration rate over the entire interval extending back to the last point in time when the motion of the member was within the permissible acceleration rate, i.e. the instant in which an effective control signal was generated by output signal generator 16. Not until the level of $V_m$ at the end of a given interval $t_i$ indicates that the average acceleration of the member since the inception of the control signal is below the permissible acceleration rate does the module switch to the first mode of operation. The waveforms in time intervals $t_6$ and $t_7$ represent the situation previously described with respect to time interval $t_3$, in which the member did not exceed the maximum permissible acceleration rate.

As will now be evident, the peak values of $V_m$ at the end of each interval $t_i$ provide a highly accurate instantaneous measure of the speed of the member with no appreciable time delay. If desired, these signals may be coupled to the input of a calibrated meter to provide a direct reading of the speed of the member. It has been found more advantageous, however, to use the $V_c$ signals for this purpose. Further, these signals may also be differentiated in the ordinary way and applied to a calibrated meter to provide a reading of the instantaneous value of the acceleration of the member. Thus, the acceleration control module can be used to provide an extremely accurate direct indication of both the instantaneous velocity and acceleration of the moving member.

Figure 2:
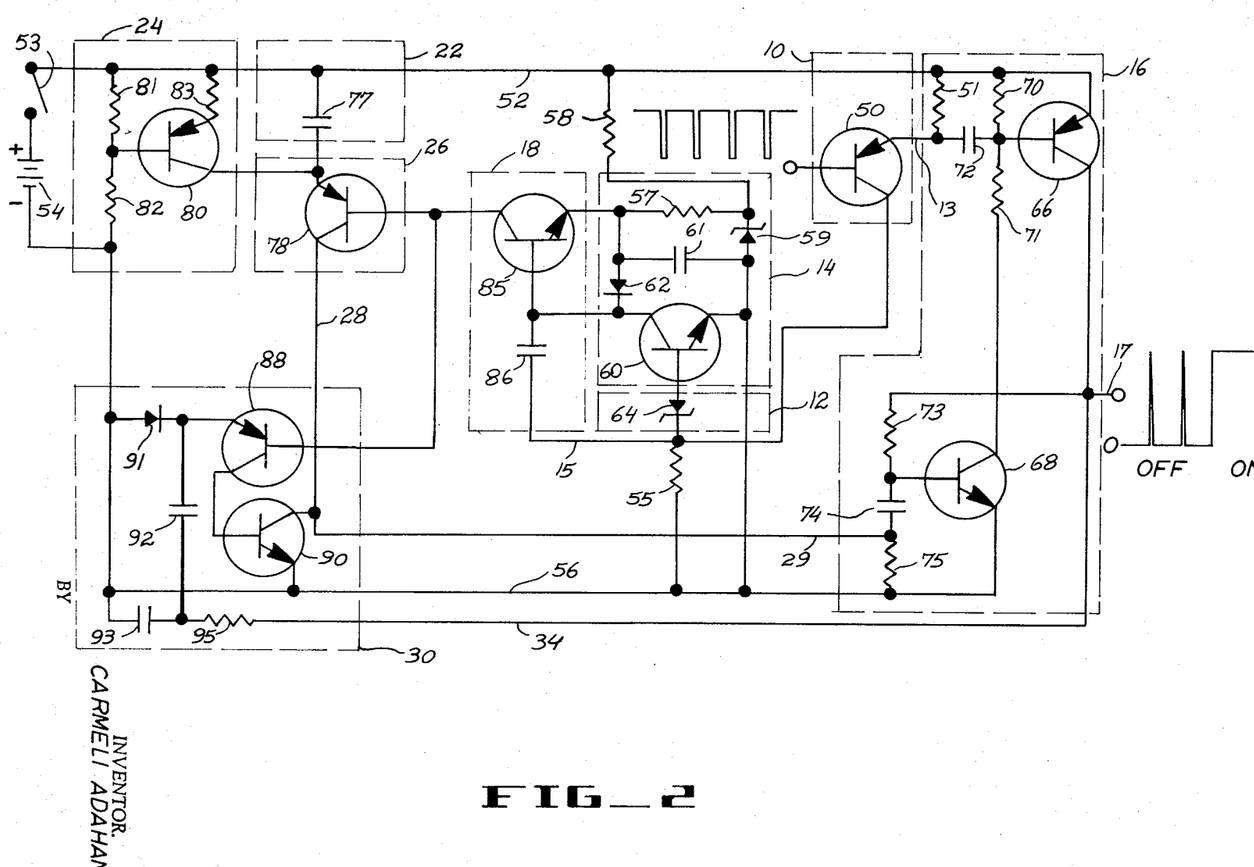
FIG. 2 is a circuit diagram of the invention of the embodiment of FIG. 1.

FIG. 2 illustrates a circuit diagram of the acceleration control module depicted in FIG. 1, the major subcircuits of FIG. 1 being designated by the numbered phantom lines. Input circuit 10 comprises a transistor 50, the emitter of which is coupled through a resistor 51 to supply buss 52, which in turn is coupled through switch 53 to source 54. The collector of transistor 50 is coupled through resistor 55 to common return 56. Transistor 50 is normally nonconductive but may be turned on by applying a negative-going signal of the type illustrated to the base thereof.

Velocity measuring circuit 14 includes a charging resistor 57 coupled to the common junction of regulating resistor 58, the other terminal of which is coupled to supply buss 52, and the cathode of zener diode 59. The anode of zener diode 59 is coupled to common return 56 along with the emitter of discharge transistor 60 and one side of charging capacitor 61. The other side of charging capacitor 61 is coupled to the common junction of charging resistor 57 and the anode of blocking diode 62. The collector of discharge transistor 60 is coupled to the cathode of diode 62, while the base of transistor 60 is coupled to the anode of zener diode 64 of reset delay circuit 12. The cathode of zener diode 64 is coupled to the common junction of the collector of input transistor 10 and resistor 55.

With power applied to supply buss 52, capacitor 61 charges through resistor 57, with zener diode 59 providing a regulated potential at the cathode thereof. When a pulse is applied to the base of discharge transistor 60 through zener diode 64, normally nonconducting transistor 60 turns on and capacitor 61 is quickly discharged to a predetermined threshold level through transistor 60 to common return 56. Upon termination of the pulse at the base of transistor 60, this transistor turns off and capacitor 61 immediately begins to recharge from this level.

Output signal generator 16 includes a pair of transistors 66, 68 which are normally biased to a nonconductive state. The base of transistor 66 is coupled to the common junction of resistors 70, 71 and one side of trigger capacitor 72. The other side of trigger capacitor 72 is coupled through resistor 51 to supply buss 52. The emitter of transistor 66 is also coupled to supply buss 52, while the collector thereof is connected to the common junction of output terminal 17 and bias resistor 73. The collector of transistor 68 is coupled to the base of transistor 66 through resistor 71, while the emitter thereof is coupled to common return 56. The base of transistor 68 is coupled to the junction of bias resistor 73 and capacitor 74. The other side of capacitor 74 is coupled to the junction of disable input conductor 29 and resistor 75, the other terminal of the latter being coupled to common return 56.

With power applied to supply buss 52, transistors 66, 68 are both nonconductive and trigger capacitor 72 assumes the potential on supply buss 52. When input transistor 50 is turned on by an input signal $V_s$, capacitor 72 quickly discharges which turns transistor 66 on. When transistor 66 turns on, the potential at output terminal 17 quickly rises, and a bias potential is supplied to the base of transistor 68 through bias resistor 73, which turns transistor 68 on. When transistor 68 turns on, resistors 70, 71 provide a base bias potential for transistor 66, which holds transistor 66 on. Transistor 66 remains on until transistor 68 is turned off.

To turn transistor 66 off, capacitor 74 is quickly charged by an external signal applied to disable input conductor 29 from the reset gate 26 (described below). When the signal on disable input conductor 29 terminates capacitor 74 discharges through resistor 75 to common return 56, reversing the bias on the base of transistor 68 and turning this transistor off. When transistor 68 turns off, the bias potential supplied to the base of transistor 66 by resistors 70, 71 is removed and transistor 66 turns off. When transistor 66 turns off, the potential at output terminal 17 quickly drops to its zero level. Both transistors 66 and 68 remain off until another input signal $V_s$ turns input transistor 50 on.

Velocity memory unit 22 comprises a charging capacitor 77, one side of which is coupled to supply buss 52. The other side of capacitor 77 is coupled to the junction of the emitter of reset gate transistor 78 and the collector of transistor 80 of acceleration generator 24.

Acceleration generator 24 comprises a constant current generator which includes serially connected resistors 81, 82 coupled between supply buss 52 and common return 56. The base of transistor 80 is coupled to the junction of resistors 81, 82 while the emitter thereof is coupled through resistor 83 to supply buss 52.

With power applied to supply buss 52, capacitor 77 assumes the value of the supply potential. Thereafter, whenever an input signal $V_s$ causes equalizer 18 to lower the potential on one side of capacitor 77 to the level of capacitor 61 in the manner described below, acceleration generator 24 provides a constant current for charging capacitor 77 toward the value of the supply potential. Although acceleration generator 24 of the FIG. 2 embodiment is connected to charge capacitor 77 at a rate corresponding to a negative acceleration, these circuit connections may be changed in a known manner to discharge capacitor 77 at a rate corresponding to a positive acceleration.

Equalizer 18 includes transistor 85 the collector of which is connected to the base of reset gate transistor 78, while the emitter thereof is connected to the junction of charging resistor 57 and charging capacitor 61 of velocity measuring circuit 14. One side of a trigger capacitor 86 is coupled to the junction of the base of transistor 85 and the collector of discharge transistor 60, the other side of trigger capacitor 86 being connected to the junction of the cathode of zener diode 64 and resistor 55.

When a pulse is applied through trigger capacitor 86 to the base of transistor 85, this transistor is switched on, allowing the potential on charging capacitor 61 to be applied to the base of reset gate transistor 78. If the potential on capacitor 77 is greater than the potential on charging capacitor 61, reset gate transistor 78 will be switched on, allowing capacitor 77 to quickly discharge therethrough. When the potential on capacitor 77 is substantially equal to the potential on capacitor 61, reset gate transistor 78 is switched off, isolating capacitor 77 from capacitor 61. It is noted that the discharge of capacitor 77 through reset gate transistor 78 produces a disabling signal on disable input conductor 29 of output signal generator 16, with the effect noted above, unless this is prevented by delay disable circuit 30.

For clarity, switches X1–X3 have been omitted from FIG. 2 and delay disable circuit 30 is shown permanently connected to the various conductor leads. Delay disable circuit 30 includes first and second transistors 88, 90. The base of transistor 88 is coupled to the collector equalizer transistor 85, while the collector of transistor 88 is coupled to the base of transistor 90. The emitter of transistor 88 is coupled to the junction of the cathode of a reset diode 91 and one side of capacitor 92. The other terminal of capacitor 92 is coupled to the junction of capacitor 93 and charging resistor 95. The other side of capacitor 93, the anode of diode 91, and the emitter of transistor 90 are coupled to common return 56. The collector of transistor 90 is coupled to the collector of reset gate transistor 78 and disable input conductor 29 of output signal generator 16. The remaining terminal of charging resistor 95 is coupled to output terminal 17 via enable conductor 34.

When output signal generator 16 is not disabled by a disable signal on output conductor 29, capacitors 92, 93 are charged through resistor 95 by the signal potential at terminal 17. When the junction of capacitors 92, 93 reaches a potential close to that of terminal 17, transistor 88 is placed in a ready condition by the potential at the emitter thereof. The period of time required for this junction to reach an enabling level is a function of the time constant of the capacitor 93-resistor 95 combination. This time constant is selected large enough to require the potential at terminal 17 to maintain signal level for at least a few cycles before transistor 88 will be placed in a ready condition. Thereafter, whenever equalizer 18 enables reset gate 26, transistor 88 is also enabled if the potential on capacitor 92 is greater than the potential on capacitor 61. When transistor 88 is enabled by this combination of emitter-base potentials, transistor 90 is switched on and the emitter potential of transistor 88 drops to value of the potential on capacitor 61. When transistor 90 is switched on, any subsequent pulse on conductor 28 will be shunted through transistor 90 to common return 56. After termination of the enabling signal from equalizer 18, transistor 88 is disabled but ready, transistor 90 is switched off, and the potential on the emitter of transistor 88 remains at the former level of capacitor 61.

Delay disable circuit 30 is completely disabled by termination of the effective output signal at terminal 17 as follows. The above-described operation of the circuit continues so long as the potential on capacitor 92 is greater than the potential on capacitor 61 whenever equalizer 18 provides an enabling signal to the base of transistor 88. This condition will obtain so long as each successive peak value of $V_m$ is less than the former, which corresponds to a member whose velocity increases with time (a positively accelerating member in the FIG. 2 embodiment). When the member ceases to accelerate, two successive peak values of $V_m$ will be equal, and consequently the potential on capacitor 92 will no longer be greater than the potential on capacitor 61 when equalizer 18 provides an enabling signal to the base of transistor 88. When this condition obtains, transistor 90 will not be switched on, and any subsequent pulse on conductor 28 will not be shunted to ground but will disable output signal generator 16 in the manner described above. When output signal generator 16 is disabled, the potential at terminal 17 drops to zero signal level as does the junction of capacitors 92, 93, and the emitter of transistor 88 is permitted to follow this potential swing by reset diode 91. Delay disable circuit is now disabled.

The operation of the acceleration control module of FIG. 3 proceeds as follows. When switch 53 is closed, power is applied to supply buss 52, capacitor 72 quickly assumes the potential on supply buss 52 and capacitor 61 begins to charge. Capacitor 77 assumes the potential on supply buss 52. Upon application of a signal $V_s$ to input circuit 10, transistor 50 is switched on for the duration of that signal, transistors 66 and 68 are also switched on and the potential rises at output terminal 17. Substantially simultaneously therewith transistor 85 is switched on along with transistor 78, and capacitor 77 is discharged to substantially the same potential level as capacitor 61. Discharge capacitor 77 produces a pulse via conductors 28, 29 to charge capacitor 74 at the base of transistor 68. After termination of this pulse, capacitor 74 then discharges turning off both transistors 66, 68 of output signal generator 16 and dropping the potential at output terminal 17 to zero level. Since the potential at output terminal 17 was only momentarily at the signal level, capacitor 92 is not charged sufficiently to enable the delay disable circuit 30.

After discharge of capacitor 77 to the level of capacitor 61, transistors 78, 85 are switched off. Immediately thereafter, the delay pulse through zener diode 64 switches on transistor 60 and capacitor 61 discharges to a predetermined threshold level equal to the potential of common return 56. After termination of the pulse on the base of transistor 60, capacitor 61 begins to charge through charging resistor 57. Capacitor 77 likewise begins to charge through acceleration generator 24.

Upon receipt of a second signal $V_s$, transistor 50 is again switched on, resulting in the enabling of output signal generator 16 as already described. As before, transistors 85 and 78 are switched on and if the potential on capacitor 77 is greater than the potential on capacitor 61, capacitor 77 discharges to the level of capacitor 61 and output signal generator 16 is disabled via conductors 28, 29. Transistors 78, 85 are switched off and capacitor 61 is discharged through transistor 60. Capacitors 77 and 61 begin to charge anew, capacitor 77 from the former level of capacitor 61, and capacitor 61 from the predetermined threshold level.

The first mode of operation continues until a subsequently applied $V_s$ finds the potential on capacitor 61 at a higher level than the potential on capacitor 77, which indicates that the moving member has exceeded the maximum permissible acceleration rate. Under these circumstances, when transistor 85 is enabled by the pulse through capacitor 86, neither this transistor nor transistor 78 will switch on due to the relative magnitudes of the potentials on capacitors 61 and 77. Thus, capacitor 77 will not discharge and no disable signal will be applied to switch off transistors 68 and 66. Consequently, the potential at terminal 17 will remain at signal level to produce an effective output signal.

Capacitor 61 will then be discharged to the predetermined threshold level and begin to charge once again. Capacitor 77 will continue to charge undisturbed throughout this second mode of operation.

The acceleration control module will remain in this state until a subsequently applied $V_s$ finds the potential on capacitor 77 at a higher level than the potential on capacitor 61, indicating that the average acceleration of the moving member since the inception of the effective output signal has fallen back within the permissible range. When this occurs, the acceleration control module reverts to the first mode of operation, described above, unless delay disable circuit 30 is enabled.

If the potential at output terminal 17 has remained at signal level for a time sufficient to place transistor 88 in the ready state, delay disable circuit 30 will be enabled by equalizer 18 and shunt the pulse from reset gate 26 on conductor 28 through transistor 90 to common return 56. Shunting of this pulse prevents capacitor 74 from removing the bias potential from the base of transistor 68, and transistors 68 and 66 remain switched on, resulting in the continuation of the effective output signal at terminal 17. Output generator 16 will continue to generate an effective output signal at terminal 17 until a subsequent $V_s$ finds the potential on capacitor 77 at a higher level than the potential on capacitor 61, and the potential at the emitter of transistor 88 at the same level or below the potential on capacitor 61, indicating that the member is no longer accelerating. When these conditions obtain, transistor 90 will not be switched on and the pulse from reset gate 26 on conductor 28 will not be shunted to common return 56, but will continue along conductor 29 to disable output signal generator 16. When output signal generator 16 is disabled, delay disable circuit is also disabled and the acceleration control module reverts to the first mode of operation.

As mentioned above, the acceleration control module may be used as a velocity and/or acceleration indicator. For this purpose the $V_c$ signals at the emitter of reset gate transistor gate 26 can be used to drive a precalibrated voltmeter or other known device to provide a velocity indicator. These same signals can be coupled to a standard differentiating circuit, the output of which can be also used to drive a calibrated voltmeter or other known device to provide an acceleration indicator. When used for this purpose, output signal generator 16 and delay disable circuit 30 may be eliminated if desired and constant current generator 24 may be replaced with any suitable current generator known to those skilled in the art.

The acceleration control module may also be used to control the motion of a rotating member, such as a motor shaft, to prevent the member from exceeding a predetermined maximum permissible positive or negative acceleration rate. When so utilized, the effective output signals present at output terminal 17 provide control signals which may be used to drive a control apparatus, e.g. a power relay for a motor circuit.

As is evident from the waveforms portrayed in FIG. 2 adjacent output terminal 17, in the first mode of operation (wherein no control signal is required) output signal generator 16 produces narrow spike pulse signals. Normally, the minimum response time of typical user devices to be controlled by the acceleration control module is sufficiently long, and the duration of these pulses is sufficiently short, to render such devices insensitive to the spike pulses. For example, in one such application, the user device comprises a solenoid having a minimum response time of about 2 miliseconds while each spike pulse had a duration of less than 100 microseconds. No user devices have been encountered which have suffered from the production of these spike pulses. However, if desired, the user device may be supplied with a filter to eliminate any undesirable effects caused by these spike pulses. The acceleration control module has also been found highly suitable for use as the control module in an anti-skid braking system for wheeled vehicles, e.g. automobiles. The application of the invention to an automobile anti-skid braking system will now be described, it being understood that the ensuing description is equally applicable to other wheeled vehicles, such as airplanes, with minor modifications.

In an automobile braking system, each vehicle wheel is normally equipped with an hydraulic brake mechanism for applying friction to that wheel to slow the vehicle. When a braking force is applied, usually by an operator applying pressure to a pedal, each wheel is decelerated to a speed less than that of the moving vehicle. If the braking force applied is too great for a given surface, however, one or more of the wheels will lock and the rolling friction between the surface of the locked wheel and the highway surface will be changed to sliding friction therebetween, usually resulting in loss of directional control of the vehicle (skidding). To prevent such loss of control, the braking mechanism should be supplied with an automatic control system which regulates the application of braking force to the wheels in a manner which provides optimum stopping distance without wheel lock and which overrides the pedal action of the operator. Such a system may comprise the acceleration control module already described and the mechanical braking apparatus disclosed in my copending application, Ser. No. 831,580, filed June 9, 1969. Briefly described, that apparatus comprises an arrangement for relieving the brake pressure at a given wheel by activating a solenoid in response to a control signal. In such a system, the acceleration control module provides the control signals which regulate pressure in the hydraulic cylinder at each wheel unit in the following manner, described now with reference to FIG. 4.

Figure 4:
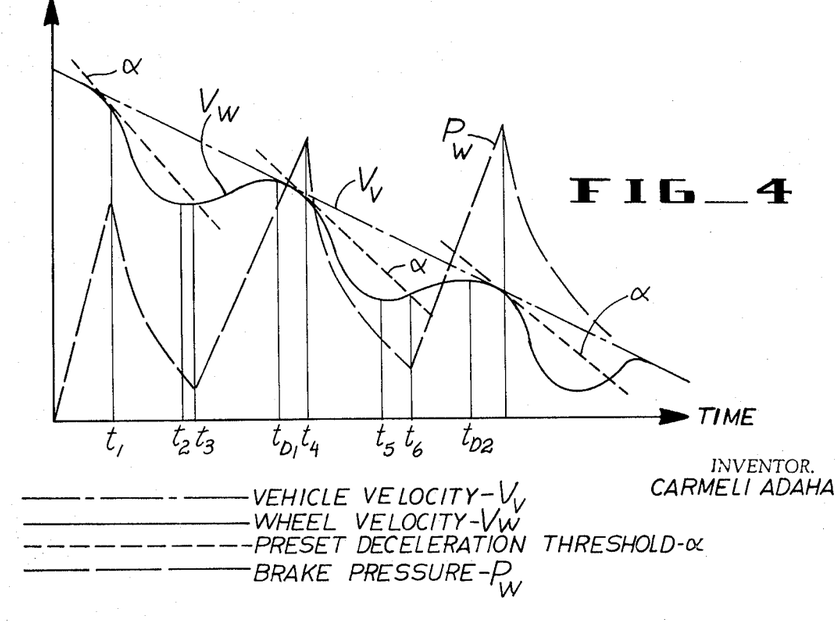
FIG. 4 is a series of idealized waveforms illustrating the application of the invention to an anti-skid braking system.

FIG. 4 is an idealized plot of vehicle velocity $V_v$, wheel velocity $V_w$ of a single wheel, and brake pressure $P_w$ against time, the origin of the abscissa representing the point in time at which braking action is begun by the operator. Tangent to the wheel velocity $V_w$ curve at repetitive intervals is a plot of the preset deceleration threshold $\alpha$.

The preset deceleration threshold $\alpha$ represents a maximum deceleration rate which the wheel is permitted to attain before the brakes are automatically released by a control signal from the acceleration control module. Threshold $\alpha$ is empirically selected for a given vehicle. For medium size automobiles, e.g. $\alpha$ can be chosen approximately equal to $2g$, i.e. twice the value of the gravitational acceleration constant, with excellent results. It is understood that other values of $\alpha$ can be selected to provide equally effective results, depending on automobile weight, road surface conditions, and other known factors.

Once a value for $\alpha$ has been selected for a given type of vehicle, the brake pressure is always relieved whenever the wheel exceeds this predetermined rate of deceleration. Thus, beginning at the origin of the FIG. 4 plot ($t = 0$), $V_v$ and $V_w$ are identical, and $P_w$ is zero. As the operator applies the brakes, $P_w$ rises steeply, which corresponds to a braking force being increasingly applied to the wheel, $V_v$ begins to decrease as the vehicle begins to slow down in reaction to this force, and $V_w$ initially decreases uniformly with $V_v$. As $P_w$ continues to increase, $V_w$ begins to drop sharply, indicating that the wheel is beginning to lock up. At $t_1$, the slope of $V_w$ (the instantaneous deceleration of the wheel) exceeds $\alpha$, indicating that the deceleration of the wheel has exceeded the maximum permissible deceleration rate and $P_w$ is relieved by a control signal from the acceleration control module. As $P_w$ drops, $V_w$ at first continues to decrease with increasing deceleration, due to the inertia of the mechanical system and the finite response time of the mechanical system to the release of $P_w$. As the system responds to the decreasing brake pressure $P_w$, however, the instantaneous deceleration of the wheel will reach a maximum and then begin to decrease. Thereafter, both the deceleration of the wheel and $V_w$ continue to decrease until the accelerating effect of the friction between the wheel surface and the road surface balances the decelerating effect of the brake on the wheel. At this point, $t_2$ on the plot, the deceleration is zero and $V_w$ reaches a first minimum. Thereafter, the wheel begins to accelerate under the increasing influence of the wheel-road surface contact, and $V_w$ begins to increase. When the average deceleration of the wheel, measured from brake relief point $t_1$, falls below $\alpha$ at $t_3$, the control signal from the acceleration control module is terminated (if delay disable circuit 30 of FIG. 1 is disconnected) thus terminating the first antiskid braking cycle.

During the second anti-skid braking cycle, $P_w$ is permitted to rise again until the instantaneous deceleration of the wheel exceeds $\alpha$ at $t_4$, whereupon $P_w$ is relieved by a control signal from the acceleration control module. Thereafter, $P_w$ decreases and when the average deceleration of the wheel measured from brake relief point $t_4$ falls below $\alpha$, the control signal from the acceleration control module terminates, thus ending the second anti-skid braking cycle. Subsequent antiskid braking cycles proceed in the same manner until the vehicle is substantially at rest or the brakes are released by the operator.

To summarize, the acceleration control module samples the wheel velocity and produces a control signal to relieve brake pressure whenever the instantaneous deceleration of the wheel exceeds a predetermined threshold value $\alpha$, and terminates this signal to allow brake pressure to be reapplied whenever the average deceleration of the wheel as measured from the brake relief point falls below the same predetermined threshold value $\alpha$. This action is repeated until the vehicle is substantially at rest or the operator releases the pedal pressure. By relieving the brake pressure when the instantaneous value of the wheel deceleration exceeds the predetermined maximum permissible deceleration rate, locking of the wheel is prevented. By permitting reapplication of the brake pressure as soon as the average value of the wheel deceleration—as measured from the brake relief point—falls below the maximum permissible deceleration rate, optimum braking is ensured.

Under certain conditions, it has been found more advantageous to delay reapplication of the brake pressure during each anti-skid braking cycle until the wheel has accelerated back to the velocity of the vehicle, i.e. when $V_w$ equals $V_v$. By instituting such a delay, optimum braking with no wheel lock is assured under the most erratic conditions. This is effected by connecting delay disable circuit 30 (FIGS. 1 and 2) into the acceleration control module. As discussed more fully above, delay disable circuit 30 delays termination of the control signal until substantially the same value for $V_m$, the measured wheel speed, is obtained on successive cycles. Thus, during the first braking cycle, starting at $t_3$ on the $V_w$ plot of FIG. 4, it can be seen that this condition first obtains at $t_{D1}$, where $V_w$ equals $V_v$. Thus, during the first braking cycle shown in FIG. 4, termination of the $P_w$ relief signal is delayed from $t_3$ to $t_{D1}$. Likewise, during the second braking cycle, termination of $P_w$ relief signal is delayed from $t_6$ to $t_{D2}$. Successive braking cycles proceed in the same manner. By delaying reapplication of the brake pressure until $V_w$ equals $V_v$, any tendency of the wheel to lock under extremely erratic conditions is completely nullified.

Although the acceleration control module has been described as providing a predetermined maximum permissible acceleration which is a constant, in actuality this threshold is a function of the rate at which velocity measuring circuit 14 signal $V_m$ is developed. If this ate is uniform over the expected range of velocities, the predetermined acceleration threshold will be constant. By varying this rate over the range of possible velocities to be measured, the predetermined acceleration threshold may be made to vary with the magnitude of the velocities being measured. For example, if the rate of change of $V_m$ with change in velocity is smaller at low velocities than at high velocities, the predetermined acceleration threshold will be higher at low velocities than at high velocities. Conversely, if the rate of change of $V_m$ with change of velocity is higher at low velocities than at high velocities, the predetermined acceleration threshold will be smaller at low velocities than at high velocities.

The manner of varying the rate at which $V_m$ is developed depends on the particular circuits employed for velocity measuring circuit 14. In the preferred embodiment of FIG. 2, e.g. the variation in the rate at which $V_m$ develops depends on the time constant of the resistor 57-capacitor 61 combination. As is well known to those skilled in the art, this time constant may be selected to provide a charging rate which develops a potential equal to $k/t$, where k equals a constant, and $t$ equals charging time. Since velocity is inversely proportional to t, and since the inverse of the function $V = k/t$ is a linear function, a velocity measuring circuit 14 provided with such a time constant will exhibit a constant predetermined acceleration threshold over the range of velocities. Likewise, it is also known in the art to select a time constant which develops a potential $f(t)$ which is a more complex function of time, and a velocity measuring circuit 14 provided with such a time constant would exhibit a predetermined acceleration threshold which varies with velocity. As will be apparent to those skilled in the art, the manner in which the predetermined acceleration threshold varies with velocity may be preselected in accordance with the application requirements.

In an anti-skid braking system, it has been found that optimum results can be obtained if the predetermined deceleration threshold is varied with velocity in such a manner that the maximum permissible deceleration rate is greater at high velocities than at low velocities. This may be easily achieved with the acceleration control module disclosed herein by simply selecting the proper time constant in the manner described above. Likewise, for other applications, the time constant may be changed in accordance with the particular requirements of a given application.

While a particular embodiment of the invention has been shown and described, various modifications thereof will be apparent to those skilled in the art and it is therefore not intended that the invention be limited to the disclosed embodiment or details thereof; further, departures may be made therefrom within the spirit and scope of the invention as defined in the claims.

What is claimed is:

1. In a skid control system for controlling the application of braking forces or the like to a wheel of a moving vehicle; the combination of means responsive to the velocity of the wheel and operative to develop input signals having time spacing corresponding to the velocity of the rotating wheel; input switching means operative in response to the input signals to develop enabling signals having a corresponding time spacing; output signal generator means operative to develop control signals at the output thereof for controlling the braking force, the output signal generator means being rendered operative in response to the enabling signal and inoperative in response to a disable signal; a voltage source; a source of relatively constant current; velocity computer means including a velocity computer capacitor coupled to and arranged to be charged by the constant current source at a rate and to a voltage level corresponding to a maximum permissible negative or positive acceleration; velocity measuring means including a velocity measuring capacitor arranged to be charged by the voltage source to a voltage level corresponding to the instantaneous velocity of the wheel and discharge switch means operative when energized to discharge the velocity measuring capacitor to a predetermined voltage level; reset gate means controlling the charge and discharge of the velocity computer capacitor, the reset gate means being operative when energized to discharge the velocity computing capacitor, and thereby, develop the disable signal for rendering the output generator means inoperative; equalizer means operative in response to each enabling signal from the input switching means to compare the voltage levels of the velocity computer capacitor and the velocity measuring capacitor and also being operative when the velocity computer capacitor voltage level is greater than the velocity measuring capacitor voltage level to energize the reset gate means so as to reduce the voltage level of the velocity computer capacitor to the level of the velocity measuring capacitor thereby developing the disable signal and when the velocity computer capacitor voltage level is less than the voltage level of the velocity measuring capacitor to maintain the reset gate means deenergized; and reset delay means operative in response to each of the enabling signals to energize the discharge switch means a predetermined interval thereafter.

2. A skid control system as described in claim 1 further including delay disable means shunting the disable signal so that the output signal generator means remains operative until acceleration or deceleration ceases, the delay disable means including switching means operative to shunt the disable signal from the output signal generator means; comparison means controlling the switching means in response both to the level of control signals from the output signal generator and the level of the velocity measuring capacitor, the comparison means being operative when the level of the control signals sensed for a predetermined time interval are greater than the level of the velocity measuring capacitor to render the switching means operative.

3. A skid control system as described in claim 2 wherein the switching means is a switching transistor of one conductivity type and having an emitter electrode coupled to the voltage source, a collector electrode coupled to the output of the reset gate means, and a control electrode and the comparison means includes a R C network for determining the predetermined time interval and coupled to the output of the output signal generator means and a transistor of a conductivity type opposite that of the switching transistor and having an emitter electrode coupled to the R C network, a collector electrode coupled to the switching transistor control electrode and a control electrode responsive to the voltage level of the velocity measuring capacitor.

4. A skid control system as described in claim 1, wherein the equalizer means includes a semi-conductor device having an emitter electrode coupled to the velocity measuring capacitor, a collector electrode coupled to the reset gate means and a control electrode coupled to the input switching means, and a trigger capacitor interposed between the control electrode and the input switching means.

5. A skid control system as described in claim 4 wherein the reset delay means is a Zener diode having the anode thereof connected to the semi-conductor device control electrode and the cathode thereof connected to the input switching means.

6. A skid control system as described in claim 4 wherein reset gate means is a reset transistor having an emitter coupled to the velocity computer capacitor, a collector coupled to the input of the output signal generator means and a control electrode coupled to the equalizer means and the output signal generator means includes input and output transistors of opposite conductivity types, the input transistor including an emitter electrode coupled to one side of the voltage source and a collector electrode coupled to the output of the output signal generator means and a control electrode coupled to the output of the input switching means, the output transistor having a collector electrode coupled to the control electrode of the input transistor, an emitter electrode coupled to the other side of the voltage source and a control electrode coupled both to the reset gate means and the output of the output signal generator, and R C network connected between the reset gate means and the control electrode of the input transistor and another R C network connected between the input switching means and the control electrode of the input transistor.

7. A skid control system as described in claim 1 wherein the reset gate means is a reset transistor having an emitter coupled to the velocity memory capacitor, a collector coupled to the input of the output signal generator means and a control electrode coupled to the equalizer means.

8. A skid control system as described in claim 1 wherein the constant current source comprises a voltage divider network connected across the voltage source and a transistor having a control electrode coupled to the voltage divider network , an emitter electrode coupled to the voltage source and a collector electrode, the emitter and collector electrodes being coupled across the velocity computer capacitor.

9. A skid control system as described in claim 1 wherein the output signal generator means includes input and output transistors of opposite conductivity types, the input transistor including an emitter electrode coupled to one side of the voltage source, a collector electrode coupled to the output of the output signal generator means and a control electrode coupled to the output of the input switching means, the output transistor having a collector electrode coupled to the control electrode of the input transistor, an emitter electrode coupled to the other side of the voltage source and a control electrode coupled both to the reset gate means and the output of the output signal generator, an R C network connected between the reset gate means and the control electrode of the output transistor and another R C network connected between the input switching means and the control electrode of the input transistor.

10. In a skid control system for controlling the application of braking forces or the like to a wheel of a moving vehicle; the combination of means operative in response to the velocity of the wheel to develop enabling signals having a time spacing corresponding to the velocity of the wheel; velocity measuring means including an energy source, a velocity measuring capacitor arranged to be charged by the energy source to a peak level, discharge means operative in response to each enabling signal to successively discharge the velocity measuring capacitor to a certain threshold level so that each peak level corresponds to the instantaneous velocity of the wheel and the difference between successive peak levels represents the actual positive or negative acceleration of the wheel; velocity computer means including a velocity computer capacitor, means charging the velocity computer at a rate representing the maximum permissible negative or positive acceleration rate; reset means operative when enabled to discharge the velocity computer capacitor and also to develop a disable signal; equalizer means operative in response to each enabling signal to compare the voltage levels of the velocity computer capacitor and the velocity measuring capacitor and also being operative when the velocity computer capacitor voltage level is greater than the velocity measuring capacitor voltage level to enable the reset means so as to reduce the voltage level of the velocity computer capacitor to the level of velocity measuring capacitor and when the velocity computer capacitor level is less than the voltage level of the velocity measuring capacitor to maintain the reset means disabled; and output means operative to control the braking force, the output means being rendered operative in response to the enabling signals and inoperative in response to the disable signals.

* * * * *